United States Patent
Buell et al.

(10) Patent No.: US 6,561,298 B2
(45) Date of Patent: May 13, 2003

(54) MOTORCYCLE FRONT BRAKE ROTOR MOUNTING

(75) Inventors: Erik F. Buell, Mukwonago, WI (US); Julian A. Galgoczy, N. Kingstown, RI (US); Abraham Askenazi, Burlington, WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/901,494

(22) Filed: Jul. 9, 2001

(65) Prior Publication Data

US 2003/0006079 A1 Jan. 9, 2003

(51) Int. Cl.$^7$ .............................................. F16D 65/12
(52) U.S. Cl. .................................. 180/221; 188/218 A
(58) Field of Search ................................. 180/219, 221; 188/18 A, 218 XL, 218 A; 403/29, 30

(56) References Cited

U.S. PATENT DOCUMENTS

| | | | |
|---|---|---|---|
| 3,692,150 A | * 9/1972 | Ruppe, Jr. ................. | 188/71.5 |
| 3,709,561 A | 1/1973 | De Biasse et al. | |
| 3,927,740 A | * 12/1975 | Zarembka ............. | 188/218 XL |
| 4,488,761 A | 12/1984 | Buell | |
| 4,641,731 A | * 2/1987 | Kawaguchi et al. .. | 188/218 XL |
| 4,660,683 A | 4/1987 | Hayashi et al. | |
| 4,662,482 A | 5/1987 | Bass | |
| 4,716,993 A | * 1/1988 | Bass ......................... | 188/18 A |
| 4,784,246 A | * 11/1988 | Edmisten .............. | 188/218 XL |
| 5,492,205 A | 2/1996 | Zhang | |
| 5,560,452 A | * 10/1996 | Labougle .............. | 188/218 XL |
| 5,732,798 A | 3/1998 | Toson | |

* cited by examiner

Primary Examiner—Lesley D. Morris
Assistant Examiner—Tony Winner
(74) Attorney, Agent, or Firm—Michael Best & Friedrich LLP

(57) ABSTRACT

A motorcycle that includes a frame, a wheel mounted to the frame for rotation about an axis of rotation, a rotor mounted to the wheel, and a caliper selectively clamping the rotor to slow down the rotation of the wheel. The rotor includes a slot having flat sides that are non-parallel with respect to each other. The assembly further comprises a spacer positioned within the slot and having flat sides substantially parallel to said sides of the slot such that the flat sides of the spacer maintain contact with the flat sides of the slot during thermal expansion of the rotor. A spring is preferably provided between the rotor and the wheel and is offset from a fastener. The spring biases the rotor against the head of the fastener.

14 Claims, 4 Drawing Sheets

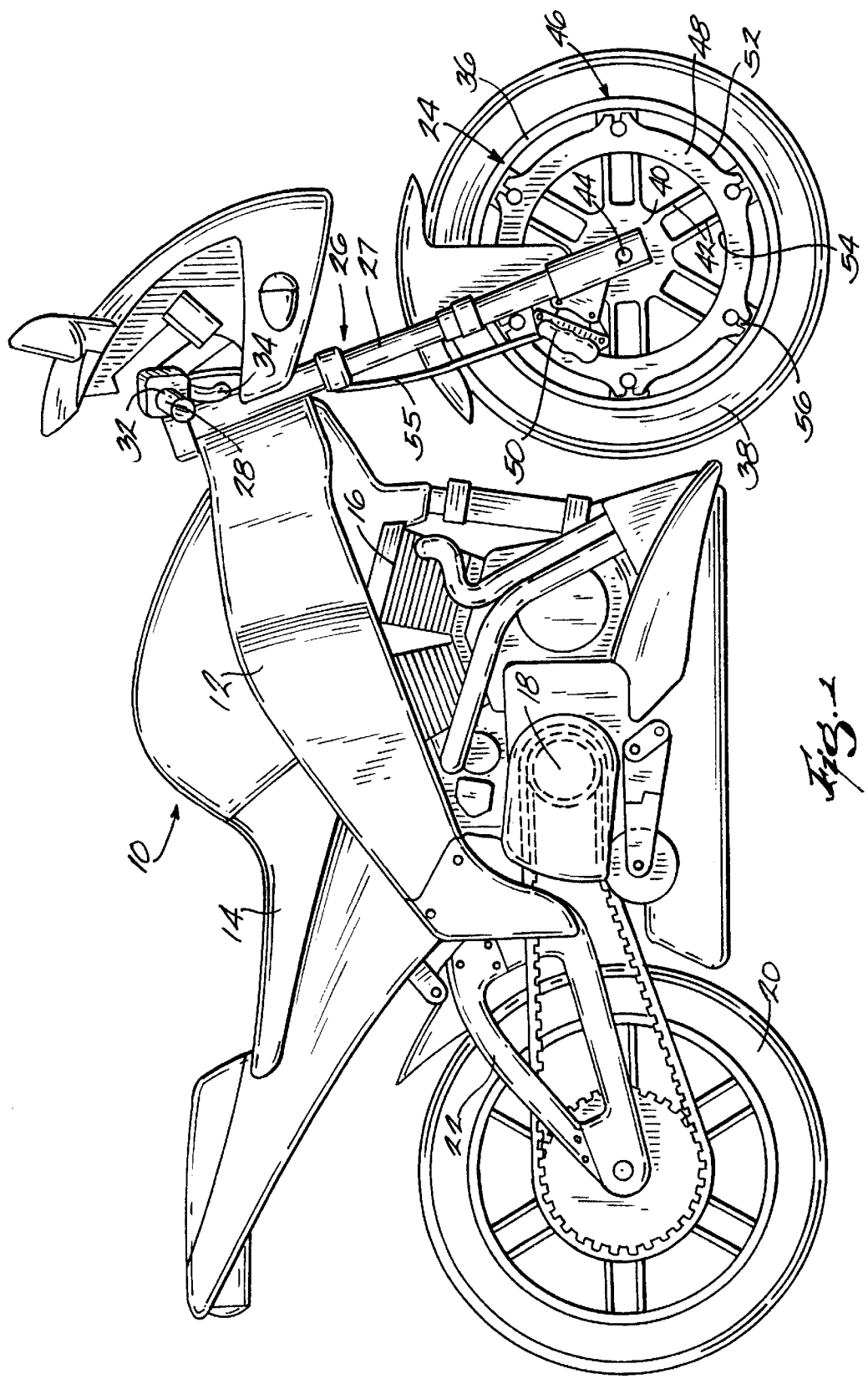

MOTORCYCLE FRONT BRAKE ROTOR MOUNTING

BACKGROUND

The invention relates to motorcycle braking assemblies, and more particularly to brake rotor mounting assemblies.

It is known to use disc brakes on a motorcycle. Disc brake assemblies include a disc or rotor mounted to a wheel, and a caliper positioned next to the rotor and capable of clamping onto the rotor to slow down the rotation of the associated wheel. Known motorcycle disc brake assemblies fall roughly into two categories. The first category includes a rotor mounted at the hub of the wheel and a caliper clamping the radially outer edge of the rotor. This is the most common type of disc brake assembly used on existing cars and motorcycles.

The second category, a so-called "inside-out" assembly, includes a ring-shaped rotor mounted to the wheel along the rotor's radially outer edge, and a caliper clamping the radially inner edge of the rotor. During braking, a rotor can become very hot due to the friction between the caliper and the rotor. It is known to mount inside-out rotors in a way that permits radial thermal expansion of the rotor during braking.

One known assembly for this purpose is disclosed in U.S. Pat. No. 4,716,993 (Bass), which teaches in FIGS. 8 and 9 an inside-out rotor having slots (60) in its outer edge. The rotor is mounted to a motorcycle's wheel rim (16) with a spacer bush (64). The slots and spacer bush each have flat sides that are parallel to each other. According to the teachings of Bass, starting at column 4, line 66, "As the temperature of the discs begins to rise during braking, the disc will expand radially and said adjacent edge of the opening will slide along the flat of its bush."

SUMMARY

The present invention involves the realization that disc brake rotors expand radially under thermal loads. Thus, a slot having parallel sides, such as taught by Bass, will widen as it thermally expands. Thermal expansion in the Bass assembly will therefore cause the sides of the slots to move away from the flats of the bush, which results in diminishing contact between the rotor and the bush during braking as the rotor is heated.

The present invention provides a motorcycle comprising a frame, a wheel mounted to the frame for rotation about an axis of rotation, a rotor mounted to the wheel, and a caliper selectively clamping the rotor to slow down the rotation of the wheel. The rotor includes a slot having flat sides that are non-parallel with respect to each other. The assembly further comprises a spacer positioned within the slot and having flat sides substantially parallel to the sides of the slot such that the flat sides of the spacer maintain contact with the flat sides of the slot during thermal expansion of the rotor.

Preferably, the rotor is ring-shaped and the brake assembly is an inside-out brake assembly. The spacer may be integrally formed with the wheel rim or may include a nut that is separable from the wheel. The assembly may further include a fastener that extends through the spacer and into the wheel, and that includes a head that prevents the rotor from moving away from the wheel. A spring is preferably provided between the rotor and the wheel and is offset from the fastener. The spring biases the rotor against the head of the fastener.

Other features and advantages of the invention will become apparent to those skilled in the art upon review of the following detailed description, claims, and drawings.

BRIEF DESCRIPTION OF THE DRAWINGS

FIG. 2 is an enlarged side view of the font wheel of the motorcycle of FIG. 1.

Figure 1:
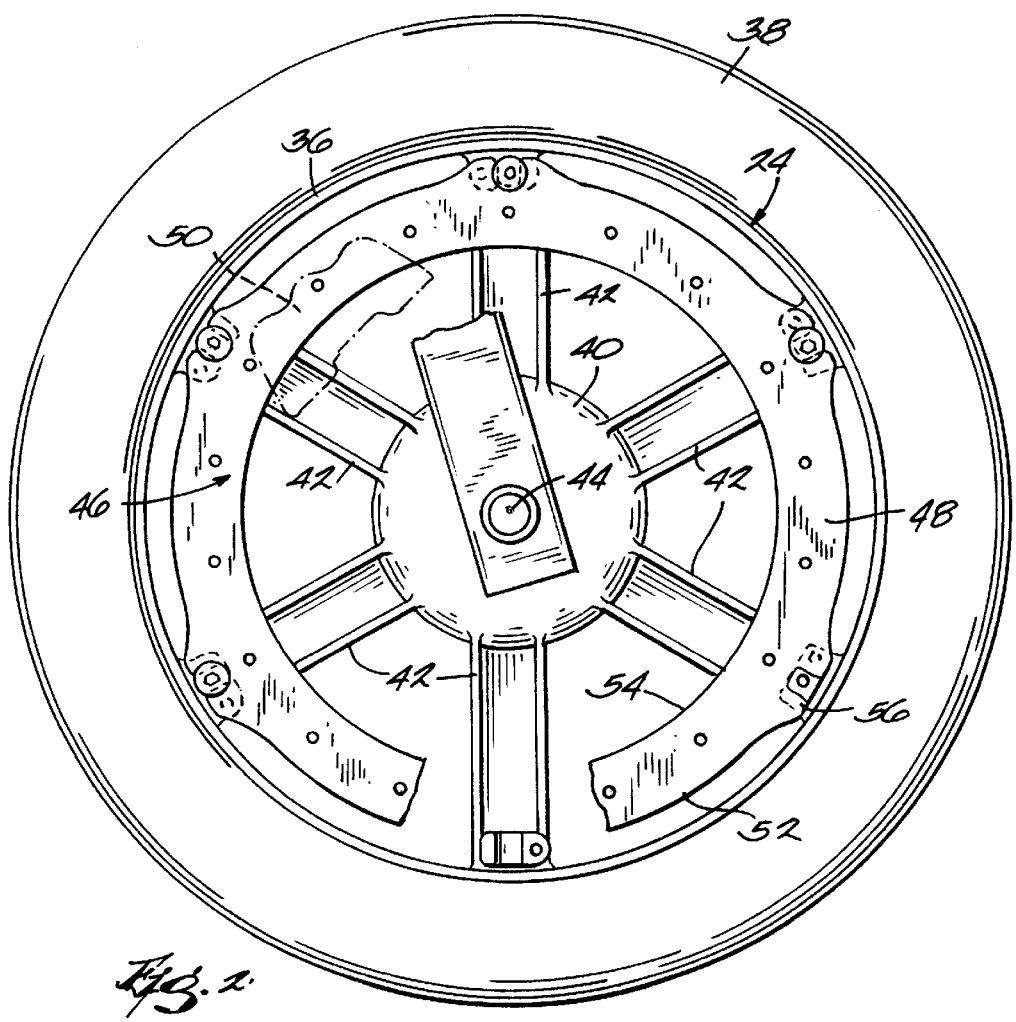
FIG. 1 is a side view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 having a frame 12 and a seat 14, engine 16, and transmission 18 all supported by the frame 12. A rear wheel 20 is interconnected to the frame 12 with a swingarm 22, and a front wheel 24 is interconnected to the frame 12 with a steering assembly 26 including a front fork 27 and handlebars 28. Mounted to the handlebars 28 is the motorcycle control system, including a throttle 32 and a brake handle 34.

FIG. 2 is an enlarged side view of the front wheel 24 of the motorcycle 10. The front wheel 24 includes a rim 36, a tire 38 mounted to the rim 36, a hub 40, and a plurality of spokes 42 extending in a radial direction from the hub 40 to the rim 36. The front wheel 24 is mounted to the steering assembly 26 for rotation about a rotational axis 44.

An inside-out disc braking assembly 46 is mounted to the motorcycle 10 and includes a brake rotor 48 mounted to the front wheel 24 and a caliper 50 mounted to the front fork 27. A similar disc braking assembly 46 may also be provided on the rear wheel 20, or a hub-mounted rotor may be employed on the rear wheel 20. The rotor 48 is generally ring-shaped, and has a center axis, an outer edge 52, and an inner edge 54. The rotor 48 is mounted to the front wheel 24 such that the center axis is collinear with the rotational axis 44 of the front wheel 24. The rotor 48 is mounted to the rim 36 as will be described below in more detail, but could alternatively be mounted to the plurality of spokes 42 in a similar fashion.

The caliper 50 is positioned proximate to the inner edge 54 of the rotor 48. A brake cable 55 interconnects the caliper 50 and one of the brake handles 34 such that the caliper 50 selectively clamps onto the rotor 48 in response to actuation of the brake handle 34. Once clamped onto the rotor 48, the caliper 50 causes the rotor 48, and consequently the front wheel 24, to slow down due to the frictional engagement between the caliper 50 and the rotor 48.

Figure 3:
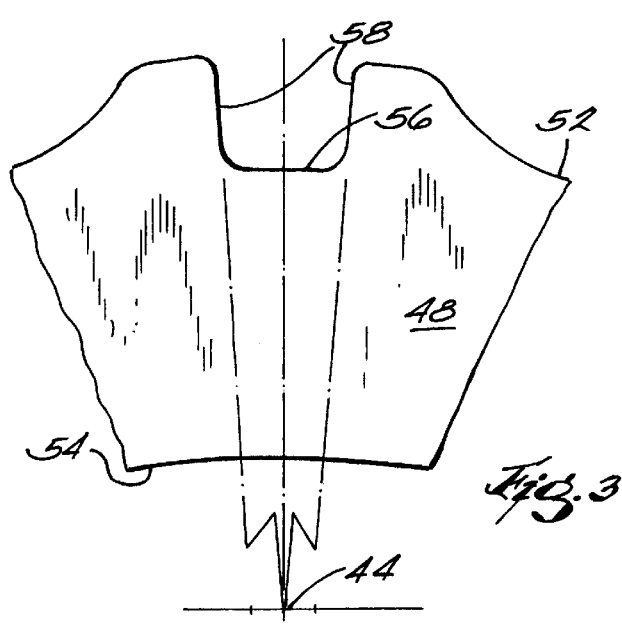
FIG. 3 is an enlarged side view of a slot in the front brake rotor of the motorcycle of FIG. 1.
Figure 4:
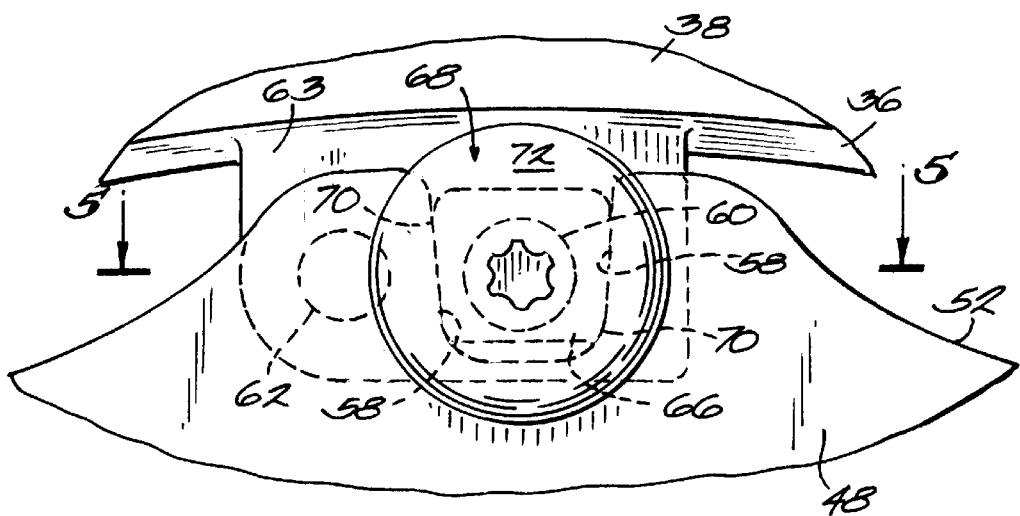
FIG. 4 is an enlarged side view of a portion of the front brake rotor and wheel.

Turning now to FIGS. 3 and 4, the rotor 48 includes a plurality of slots 56 along its outer edge 52. The illustrated slots 56 are open-ended, but may alternatively be close-ended slots. Each slot 56 includes a pair of flat edges 58 that are non-parallel to each other. The flat edges 58 preferably define lines that extend in the radial direction and converge at the hub 40 on the axis of rotation 44 of the wheel 24.

Figure 5:
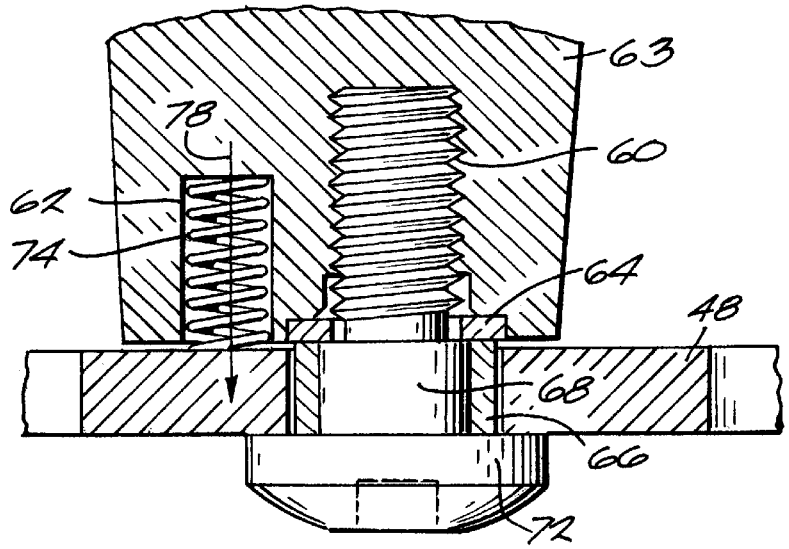
FIG. 5 is a cross-section view taken along line 5—5 in FIG. 4.
Figure 6:
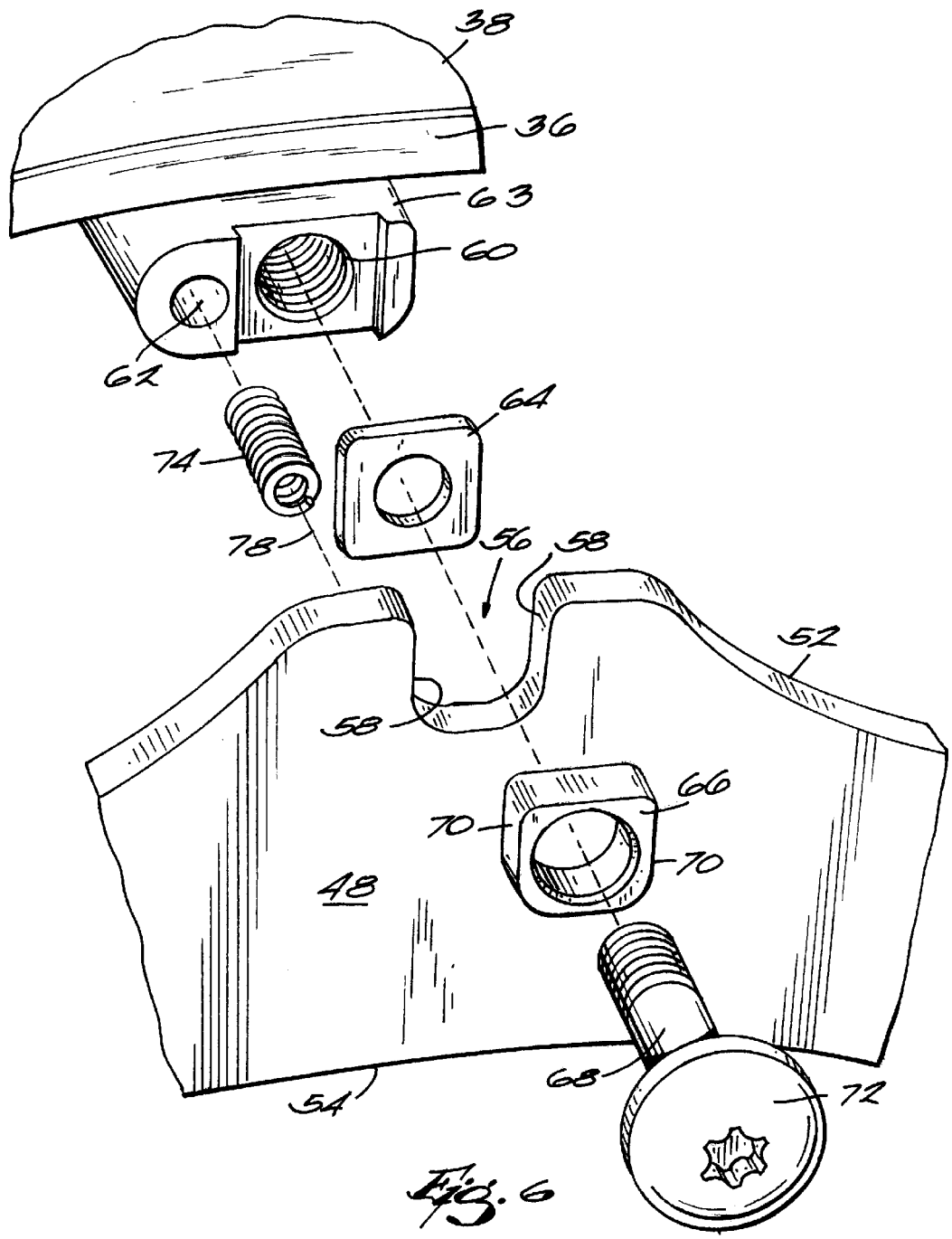
FIG. 6 is an enlarged exploded view of a portion of the front brake assembly of the motorcycle of FIG. 1.

Turning to FIGS. 5 and 6, a threaded bore 60 and a smooth blind bore 62 are provided in a boss 63 extending away from the radially inward face of the rim 36, or alternatively from a spoke 42 of the wheel 24. The rotor 48 is mounted to the wheel 24 by way of a washer 64, a spacer 66 and a fastener 68. The spacer 66 includes flat sides 70 that are non-parallel and is shaped to fit snugly into the slot 56 in the rotor 48 such that there is contact between the flat sides 70, 58 of the spacer 66 and the slot 56 substantially along the entire length of the spacer 66. In alternative embodiments, the washer 64 and the spacer 66 may be integrally-formed with the boss 63 and wheel 24. The washer 64 and spacer 66 include through-bores that permit the fastener 68 to extend through the spacer 66 and the washer 64 and thread into the threaded bore 60 in the wheel 24. The fastener 68 includes a head 72 having a diameter larger than the width of the slot 56 and spacer 66 such that the head 72 extends beyond the sides of the spacer 66.

A biasing member, such as the illustrated coil spring 74, is inserted into the blind bore 62 in the boss 63 and is compressed between the boss 63 and the rotor 48. The spring 74 thus biases the rotor 48 away from the wheel 24 and against the head 72 of the fastener 68. The spring 74 provides a resilient suspension system for the rotor 48 that gives the rotor 48 some play, but reduces noise caused by the rotor 48 bouncing between the fastener head 72 and the wheel 24. In the illustrated embodiment, the spring 74 acts along a line of force 78 that is generally parallel to, and spaced from, the longitudinal axis of the fastener 68. In this regard, the spring 74 is offset from the fastener 68.

In operation, the non-parallel, radially-directed flat sides 58, 70 of the slot and spacer 56, 66 are in contact when the rotor 48 is cool. When the brake handles 34 are actuated, the calipers 50 pinch the rotor 48. Friction between the caliper 50 and the rotor 48 causes the rotor 48 to heat up. The rotor 48 thermally expands in the radial direction under the thermal load. As used herein, "radial direction" means the line perpendicular to the axis of rotation 44 of the wheel 24. Because the flat sides 58, 70 of the slot and spacer 56, 66 are radially-directed, the flat sides 58, 70 remain in substantially full contact with each other even as the rotor 48 thermally expands in the radial direction, and are substantially unaffected by the thermal expansion.

What is claimed is:

1. A motorcycle comprising:
   a frame;
   a wheel interconnected with said frame for rotation about an axis of rotation;
   a rotor mounted to said wheel, said rotor including a slot having flat sides that are non-parallel with respect to each other;
   a fastener positioned in the slot; and
   a caliper selectively clamping onto a portion of said rotor to slow rotation of said rotor and said wheel,
   wherein said flat sides of said slot define lines that converge substantially on said axis of rotation.

2. The motorcycle of claim 1, wherein said slot is open-ended.

3. The motorcycle of claim 1, further comprising a spacer positioned within said slot, wherein said spacer maintains substantially continuous contact with said flat sides of said slot during thermal expansion of said rotor.

4. The motorcycle of claim 3, wherein said spacer includes two flat sides that are non-parallel with respect to each other such that said spacer fits within said slot with each flat side of said spacer extending along and parallel to a respective one of said flat sides of said slot, wherein said flat sides of said spacer maintain substantially continuous contact with said flat sides of said slot along substantially the entire flat sides of said spacer during thermal expansion of said rotor.

5. The motorcycle of claim 3, wherein said fastener extends through said spacer, said fastener including a head capturing said rotor between said head and said wheel.

6. The motorcycle of claim 3, wherein said spacer is separable from said wheel.

7. The motorcycle of claim 1, wherein said wheel includes a rim having a radially inward face, and wherein said rotor is mounted to said radially inward face of said rim.

8. The motorcycle of claim 1, wherein said rotor is ring-shaped and has an inner edge, and wherein said caliper is operable to selectively clamp onto said inner edge of said rotor.

9. The motorcycle of claim 1, further comprising a biasing member interposed between said rotor and said wheel, wherein said fastener secures said rotor to said wheel and includes a head, said biasing member biasing said rotor against said fastener head.

10. The motorcycle of claim 9, wherein said biasing member is offset with respect to said fastener.

11. A ring shaped rotor comprising:
    a center axis;
    an inner edge located at a first radial distance from said center axis;
    an outer edge located at a second radial distance greater than said first radial distance from said center axis; and
    at lease one radial slot in said outer edge, said slot including flat sides that are non-parallel with respect to each other,
    wherein said flat sides define lines that converge substantially on said center axis.

12. The ring shaped rotor of claim 11, wherein said slot is open ended.

13. A motorcycle comprising:
    a frame;
    a wheel interconnected with said frame for rotation about an axis of rotation;
    a rotor mounted to said wheel, said rotor including a slot having flat sides that are non-parallel with respect to each other;
    a fastener positioned in the slot;
    a caliper selectively clamping onto a portion of said rotor to slow rotation of said rotor and said wheel; and
    a biasing member interposed between said rotor and said wheel, wherein said fastener secures said rotor to said wheel and includes a head, said biasing member biasing said rotor against said fastener head.

14. The motorcycle of claim 13, wherein said biasing member is offset with respect to said fastener.

* * * * *